(12) United States Patent
Krishnaprasad et al.

(10) Patent No.: US 7,024,425 B2
(45) Date of Patent: Apr. 4, 2006

(54) METHOD AND APPARATUS FOR FLEXIBLE STORAGE AND UNIFORM MANIPULATION OF XML DATA IN A RELATIONAL DATABASE SYSTEM

(75) Inventors: Muralidhar Krishnaprasad, Foster City, CA (US); Viswanathan Krishnamurthy, Fremont, CA (US); Ravi Murthy, Harward, CA (US)

(73) Assignee: Oracle International Corporation, Redwood Shores, CA (US)

( * ) Notice: Subject to any disclaimer, the term of this patent is extended or adjusted under 35 U.S.C. 154(b) by 450 days.

(21) Appl. No.: 09/948,998

(22) Filed: Sep. 6, 2001

(65) Prior Publication Data

US 2002/0078068 A1 Jun. 20, 2002

Related U.S. Application Data

(60) Provisional application No. 60/230,878, filed on Sep. 7, 2000.

(51) Int. Cl.
*G06F 7/00* (2006.01)

(52) U.S. Cl. .................. 707/104.1; 707/3; 707/10; 707/102; 715/501.1; 715/513

(58) Field of Classification Search .......... 707/3–104.1; 715/501.1, 513
See application file for complete search history.

(56) References Cited

U.S. PATENT DOCUMENTS

| | | | |
|---|---|---|---|
| 5,999,941 A | 12/1999 | Andersen | |
| 6,012,067 A | 1/2000 | Sarkar | |
| 6,240,407 B1 | 5/2001 | Chang et al. | |
| 6,366,934 B1 | 4/2002 | Cheng et al. | |
| 6,418,448 B1 | 7/2002 | Sarkar | |
| 6,438,540 B1 * | 8/2002 | Nasr et al. | 707/3 |
| 6,449,620 B1 * | 9/2002 | Draper et al. | 707/102 |
| 6,584,459 B1 * | 6/2003 | Chang et al. | 707/3 |
| 6,604,100 B1 * | 8/2003 | Fernandez et al. | 707/3 |
| 6,636,845 B1 * | 10/2003 | Chau et al. | 707/1 |

(Continued)

FOREIGN PATENT DOCUMENTS

EP        1 241589 A2     9/2002

OTHER PUBLICATIONS

Schmidt et al.—"Efficient Relational Storage and Retrieval of XML Documents"—CWI, The Netherlands (pps 1–6).*
ORACLE 9i "Project XDB"—The XML Database—ORACLE—2001 (pps: 1–18).*
Banerjee et al. "Oracle 8i—The XML Enabled Data Management System"—Data Engineering, IEEE/Mar. 2000 (pps: 561–568).*
Lawrence et al. "Integrating Relational Database Schemas Using a Standardized Dictionary"—2001—ACM (pps: 225–230).*
"A Performance Evaluation of Storing XML Data in Relational Database Management Systems"—Latifur Khan and Yan Rao—ACM–2001 (pps: 31–38).*

(Continued)

*Primary Examiner*—Jean Corrielus
*Assistant Examiner*—Anh Ly
(74) *Attorney, Agent, or Firm*—Hickman Palermo Truong & Becker, LLP

(57) ABSTRACT

Techniques are provided for XML data storage and query rewrites in relational databases. According to certain embodiments of the invention, a mechanism is provided to allow the user to store an XML document in a relational database and to submit mapping information that indicates a mapping of each field of the XML document to the column in the relational database in which the data from each field is stored. If the user submits an XML query to access the data in the XML document that is stored in the relational database, then a mechanism is provided to generate a database query based on the XML query and the mapping information.

34 Claims, 3 Drawing Sheets

U.S. PATENT DOCUMENTS

| | | | |
|---|---|---|---|
| 6,643,633 B1 * | 11/2003 | Chau et al. ...................... | 707/1 |
| 6,721,727 B1 * | 4/2004 | Chau et al. ..................... | 707/3 |
| 6,785,673 B1 * | 8/2004 | Fernandez et al. ............. | 707/3 |
| 6,871,204 B1 * | 3/2005 | Krishnaprasad et al. .... | 707/102 |
| 2002/0015042 A1 | 2/2002 | Robotham et al. | |
| 2002/0038358 A1 * | 3/2002 | Sweatt et al. ............... | 709/218 |
| 2002/0056025 A1 | 5/2002 | Qiu et al. | |
| 2002/0120685 A1 | 8/2002 | Srivastava et al. | |
| 2002/0123993 A1 * | 9/2002 | Chau et al. ..................... | 707/5 |
| 2002/0124100 A1 | 9/2002 | Adams | |
| 2002/0133484 A1 | 9/2002 | Chau et al. | |
| 2002/0156772 A1 * | 10/2002 | Chau et al. ..................... | 707/3 |
| 2002/0169788 A1 * | 11/2002 | Lee et al. ................. | 707/104.1 |
| 2002/0184401 A1 | 12/2002 | Kadel Jr. et al. | |
| 2002/0198874 A1 * | 12/2002 | Nasr et al. ..................... | 707/3 |
| 2003/0014397 A1 * | 1/2003 | Chau et al. ..................... | 707/3 |
| 2004/0064466 A1 | 4/2004 | Manikutty et al. | |

OTHER PUBLICATIONS

"From XML Schema to Relations: A Cost–Based Approach to XML Storage"—Bell Laboratories: Philip Bohannon, Juliana Freire Prasan Roy and Jerome Simeon—IEEE—2002—Proceedings of the 18th International Conference on Data Engineering (ICDE'02).*

"SRQL: Sorted Relational Query Language"—Raghu Ramakrishnan, Donko Donjerkovic, Arvind Ranganathan, Kevin S. Beyer and Muralidhar Krishnaprasad—Jul. 1–3, 1998 IEEE pps: 84–95.*

"Oracle*i—The XML Enabled Data Management System"—Oracle Corporation: Sandeepan Banerjee, Vishu Krishnamurthy, Muralidhar Krishnaprasad and Ravi Murthy—Mar. 2000 IEEE pps: 561–568.*

International Preliminary Examination Report, Application No. PCT/US03/35551, pp. 1–17.

Written Opinion, Application No. PCT/US03/35551.

Current claims in PCT/US03/35551, pp. 1–4.

Daniela Florescu et al., "A Performance Evaluation of Alternative Mapping Schemes for Storing XML Data in a Relational Database," May 1999, XP–002168318, pp. 1–31.

Daniele Braga et al., "A Graphical Environment to Query XML Data with Query," Proceedings of the Fourth International Conference on Web Information Systems Engineering (WISE '03), 2003, IEEE, 10 pages.

* cited by examiner

METHOD AND APPARATUS FOR FLEXIBLE STORAGE AND UNIFORM MANIPULATION OF XML DATA IN A RELATIONAL DATABASE SYSTEM

CLAIM OF PRIORITY

This application is related to and claims domestic priority under 35 U.S.C. § 119(e) from prior U.S. Provisional Patent Application Ser. No. 60/230,878 filed on Sep. 7, 2000 entitled "XML DATA STORAGE, QUERY REWRITES, VISUALIZATION, MAPPING AND REFERENCING", by inventors Muralidhar Krishnaprasad, Viswanathan Krishnamurthy, and Ravi Murthy, the entire disclosure of which is hereby incorporated by reference as if fully set forth herein.

CROSS REFERENCE TO RELATED APPLICATIONS

This application is related to U.S. patent application Ser. No. 09/949,020, filed together herewith, entitled "METHOD AND APPARATUS FOR XML VISUALIZATION OF A RELATIONAL DATABASE AND UNIVERSAL RESOURCE IDENTIFIERS TO DATABASE DATA AND METADATA," naming as inventors Muralidhar Krisbnaprasad, Viswanathan Krisbnamurthy and Ravi Murthy, the entire disclosure of which is hereby incorporated by reference as if fully set forth herein; and This application is related to U.S. patent application Ser. No. 09/948,949, filed together herewith, entitled "APPARATUS AND METHOD FOR MAPPING RELATIONAL DATA AND METADATA TO XML," naming as inventors Muralidhar Krishnaprasad, Viswanathan Krishnamurthy, Ravi Murthy and Visar Nimani, the entire disclosure of which is hereby incorporated by reference as if fully set forth herein.

1. Field of the Invention

The present invention relates generally to relational databases and, more specifically, to XML data storage, manipulation and queriability.

2. Background of the Invention

Extensible Markup Language (XML) is a World Wide Web Consortium (W3C) standard for representing data. Many applications are now being designed to output data in the form of XML documents. Various techniques may be used to store data from such XML documents into a relational database. According to one technique, each XML document is treated as a single data item, and stored as such in a single column of a relational table. This technique is convenient in that the XML does not have to be processed before it is submitted to the database server. However, because the database server considers the XML document a single data item, the database server is unable to take advantage of the fact that XML documents are structured, where a single XML document may include numerous attributes and elements with specific values.

According to an alternative technique, an XML document may be split up into its constituent attributes and element data before the XML document is stored in a database. The values for each attribute and element are submitted to the database for insertion in corresponding columns of a table. When this technique is used, the database server may be used to select data based on individual attribute values. However, when the data is retrieved from the database, the attribute values are provided as distinct data items, not as part of a single XML document. To recover the XML document, the data received from the database server must be reformatted and structured to reconstruct the XML document.

Based on the foregoing, it is desirable to provide techniques for handling XML documents that do not depend on the specific form in which they are stored. In other words, it is desirable for applications to independently decide on the storage representation of their XML data, and that does not have any impact on the functionality. However, the choice of storage could potentially affect performance of the applications. Further it is also desirable for the database server to implement techniques that exploit the chosen storage representation for optimal processing of user operations.

SUMMARY OF THE INVENTION

Techniques are provided for modeling XML data using an abstract data type in a relational database system. According to certain embodiments of the invention, the database server stores each XML document in its native form as a single data item within a column, but allows queries to address individual fields within the document. A mechanism is provided to allow the user to store an XML document in a relational database and to submit mapping information that indicates a mapping of each field of the XML document to the column in the relational database in which the data from each field is stored. Regardless of the storage representation, the XML abstract datatype has a set of operations that can be executed by the user. These operations such as extraction and transformation apply to all XML data independent of the storage formats.

A mechanism is provided to generate a database query based on an XML query and the mapping information when a user submits the XML query to access the data in the XML document that is stored in the relational database. This process involves rewriting the user queries (and other data manipulation operations) into other queries that better exploit the underlying storage representation of the XML data.

Using these techniques, the user need not be aware of the manner in which the XML documents are stored within the database in order to issue queries against the XML documents. The user may simply issue a standard XML query over XML documents, and the database server figures out how to rewrite the query appropriately based on how the XML documents are stored in the database.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figures 1, 2:
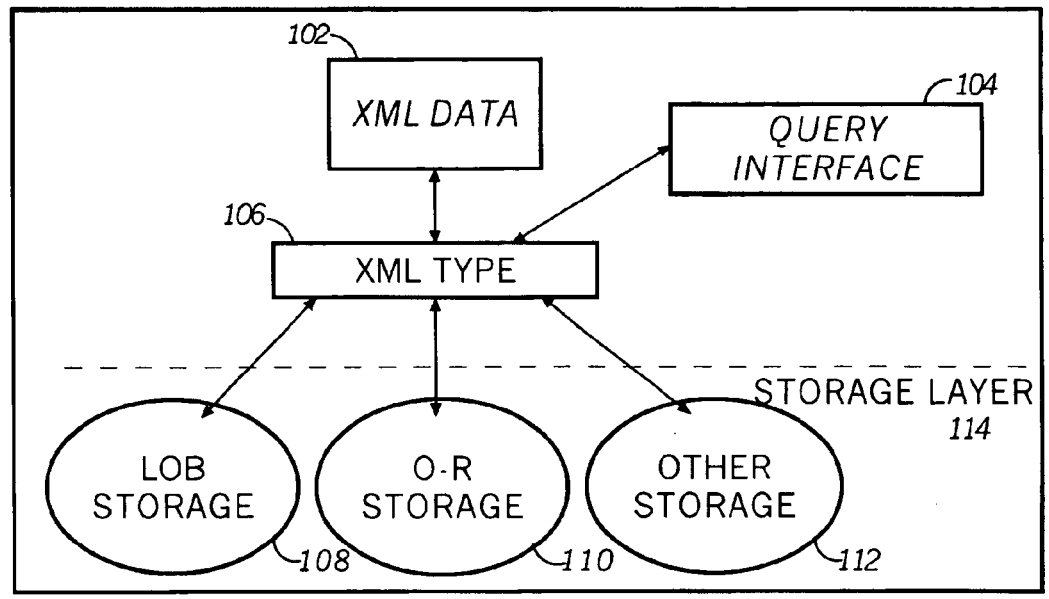
FIG. 1 is a block diagram that illustrates an XMLType storage architecture.
FIG. 2 is a block diagram that illustrates the structure of an XMLType column.

Techniques are provided for modeling XML data using an abstract data type in a relational database system, multiple storage representations, uniform query interface and optimal processing using query rewrites. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

In order to integrate the handling of XML data and SQL data in a relational database, a mechanism is provided to support an XML type datatype in the relational database for storing XML documents within columns and rows of tables. The storage representation may vary from implementation to implementation. The present invention is not limited to any particular storage representation. In certain embodiments of the invention, the user may submit an XML document for storage in the relational database. The data from each field of the XML document is automatically stored in the relational database in a manner that leverages various existing indexing mechanisms associated with storage. For example, when an XML document is submitted for storage in the relational database, a mechanism is provided to determine the corresponding storage column in the relational database for storing each field of the XML document. Thus, each field of the XML document is mapped to some column in the relational database and this mapping information is stored in the relational database. Depending on the type of data, some of the fields of data may be lumped together for storage in a single object relational column while other fields may be stored as separate object relational columns. The data from each field of XML document can be indexed using an appropriate indexing scheme. For example, a B-tree index may be used for columns that contain relational type data and a text index, such as interMedia text, may be used for columns that contain large text data. In certain embodiments, the user may specify the mapping information. By specifying the mapping information, the user may control the granularity of the mapping.

Thus, techniques are provided for 1) the uniform handling of XML data and SQL data, 2) a uniform query interface for a well-defined set of XML operations, where the set of operations are decoupled from the underlying storage mechanism for the XML data in the relational database, 3) query rewrites into a form that leverages the data access and data manipulation capabilities of the underlying storage mechanism in the relational database.

Uniform Handling of XML Data and SQL Data

Typically, in a relational database, there are pre-defined relational data types. Examples of typical pre-defined relational datatypes are number, date, string, etc. Object-relational databases may also contain user-defined object types. However, in order to provide uniform handling of XML data and SQL data, a datatype called XMLType is natively defined in the relational database system. The XMLType datatype can be used for storing any type of XML data, be it structured XML data or unstructured XML data.

FIG. 1 is a block diagram that illustrates the XMLType storage architecture. Block 102 is XML data that is to be stored using the XMLType shown at block 106. The XMLType encapsulates the underlying storage mechanisms for XML data. Some of the storage mechanisms are shown in the storage layer 114. In storage layer 114 is shown a LOB storage mechanism 108, an object relational storage mechanism 110, and an "other" storage mechanism 112. "Other" storage mechanism 112 can be any appropriate storage mechanism for XML data. Thus, the storage mechanisms in storage layer 114 do not comprise the exhaustive set of storage mechanisms for XML data. Because the XMLType encapsulates the underlying storage mechanisms, a user of XML data only sees the XMLType while the actual details of the underlying storage mechanism of the XML data are hidden from the user. Typically, an administrator of the relational database system chooses the underlying storage mechanism for the XML data that is to be stored. The administrator chooses the type of underlying storage mechanism based on performance considerations of the storage mechanism.

To illustrate storage, some of the fields of a given XML document may contain structured data. Structured data is data that is capable of being mapped to relational columns in the relational database. In another example, assume that the XML document contains the textual content of an entire book. Rather than exploding such an XML document by mapping every element or field of the XML document to a relational column, only fields that contain data that are likely to be queried by a user are mapped to pre-defined relational types, such as a string, number, etc., while the rest of the data may be lumped together and mapped to one column for Character Large Objects (CLOBs). A user may create his or her own template to specify what fields are to be mapped to relational columns and what fields are to be mapped to CLOBs.

FIG. 2 is a block diagram that illustrates the structure of an XMLType column. Column 204 is an XMLType column that contains an XML document that comprises structured data. The fields of the structured data are mapped into hidden columns 206. For example, the PONO element of the XML document is mapped to a NUMBER column, and PNAME is mapped to a string column. In FIG. 2, the crosshatched area indicates that the columns are hidden from the user's view. The user only sees a single XMLType column.

Figure 4:
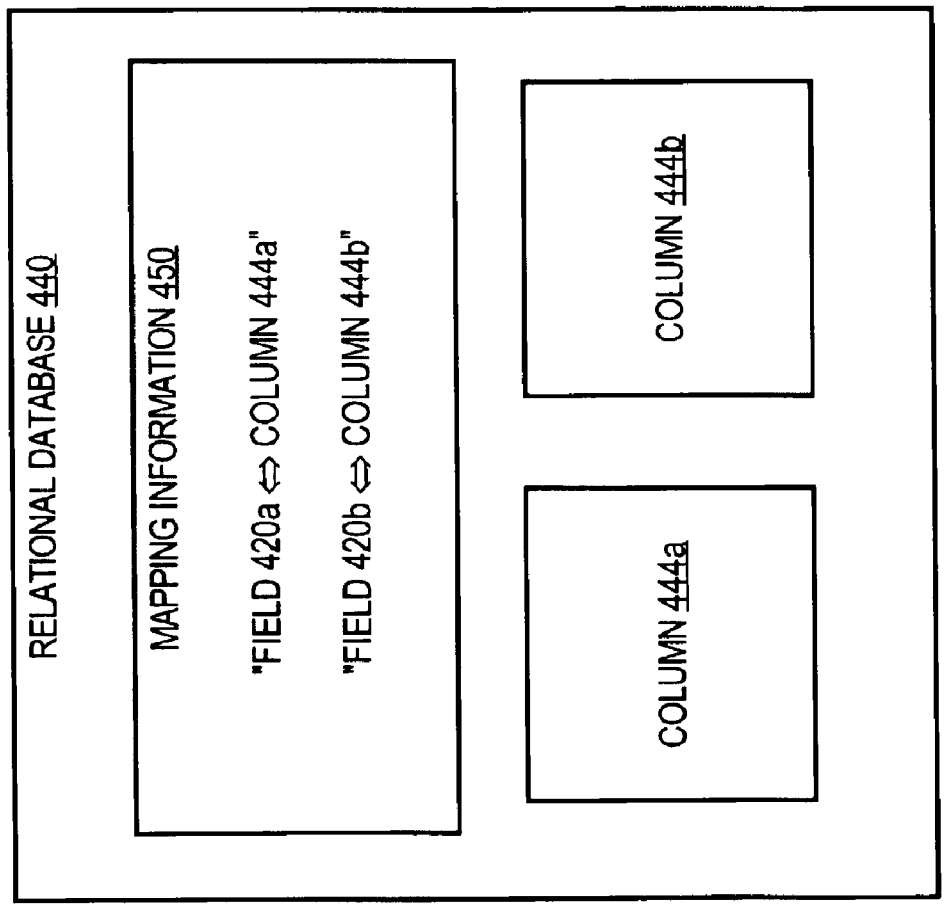
FIG. 4 is a block diagram that illustrates mapping information.
Figure 4:
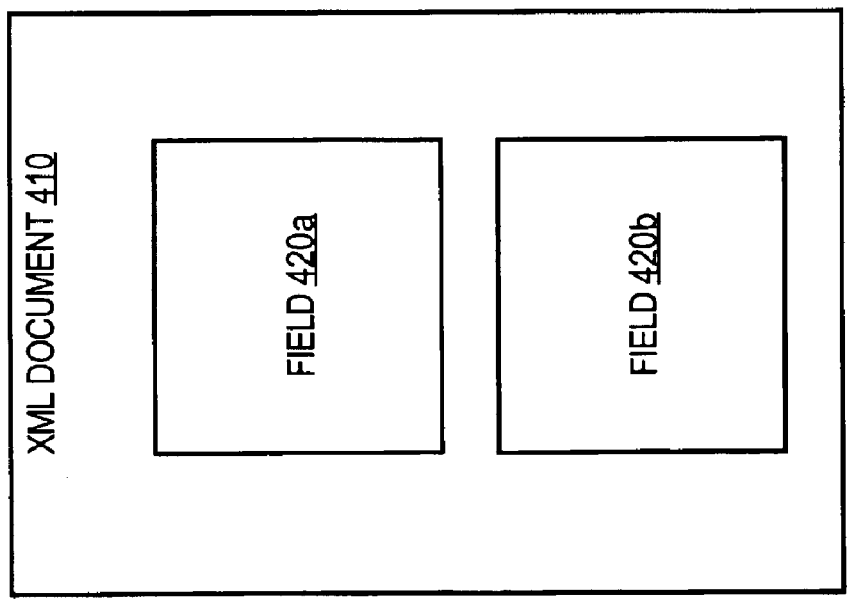

FIG. 4 is a block diagram that illustrates mapping information. In FIG. 4, mapping information 450 indicates the mapping of fields 420a, 420b in XML document 410 to the corresponding columns 444a, 444b. respectively, in relational database 440.

Uniform Query Interface

According to certain embodiments of the invention, a uniform query interface is provided in order to define a core set of operations on XMLType data that is stored in the relational database. Such operations are independent of the underlying storage format. According to certain embodiments of the invention, the operations on the XMLType data is functionally abstracted as follows:

1) Extract fragments of a given XML document
2) Test for existence of certain structures in the XML document
3) Extract certain data values in the XML document
4) Transforming a given XML document. The above list of operations is not an exhaustive list of operations for XMLType data. To illustrate some of the operations, assume that an XML document called "X" contains purchase order data. The purchase order data includes a purchase order number "PONO" with value "21", purchase order name "PNAME" with value "JOHN" and a collection of lineitems and appears as follows:

```
<PO>
    <PONO>21</PONO>
    <PNAME>JOHN</PNAME>
    <LINEITEM>
        <LINEITEMNO> 100    </LINEITEMNO>
        ...
        </LINEITEM>
    <! Other lineitems>
</PO>
```

Thus, according to certain embodiments of the invention, an example of the operation for extracting a fragment of XML document "X" is as follows:

EXTRACT (X, 'PO/LINEITEM')

The above operation extracts a fragment of the document X, wherein the fragment is a sub tree comprising of all the branches under LINEITEM.

An example of the operation for extracting certain data values in the XML document "X" is as follows:
    EXTRACTVALUE (X, 'PO/PNAME')
The above operation extracts the scalar value in PNAME, namely, "JOHN".

An example of the operation for testing for the existence of certain elements in the XML document "X" is as follows:
    EXISTSNODE (X, 'PO/[PONO=21]')
The above operation tests whether the XML document "X" has an element called PO, which in turn has a child called PONO whose value is 21.

An example of the operation for transforming the XML document using a XSL stylesheet is as follows:
    TRANSFORM (X, '<xsl> . . . stylesheet . . . </xsl>')
The above operations are completely agnostic as to the underlying storage format of the XML document.

Query Rewrites

According to certain embodiments of the invention, a mechanism is provided for rewriting user queries into a form that leverages the data access and data manipulation capabilities of the underlying storage mechanism in the relational database.

The fields of structured data of a given XML document may be mapped into separate relational columns if the data in the fields is likely to be frequently queried by a user. For example, assume that one of the fields of an XML document contains an employee name, and that it is anticipated that users will frequently query the XML documents based on the employee name value. Under these conditions, employee names may be stored in a relational column called ENAME that is separate from the column that stores the XML document itself. If a XML user submits a query to access XML documents based on a particular employee's name, then the XML user's query is automatically rewritten to access only the ENAME column.

In contrast, if no query rewrite mechanism is provided and employee names are not stored in a separate column, then, when the XML user submits a query to access a XML documents based on a particular employee's name, a Document Object Model (DOM) is created for each XML document by parsing the XML document. Then the search is performed on the DOM for the employee's name by applying an appropriate XPATH expression. Creating a DOM and then performing a search on the DOM is clearly less efficient.

In another example, the existing indexing capabilities of the relational database are used to satisfy the XML user's query. If data is expected to be frequently queried, the data can be stored in a separate relational column, and a B-tree index may be built on that column. Then, if an XML user query is submitted to select, for example, a row where PONO=21, then the B-tree index on the PONO column can be used to identify the rows that contain XML documents that have the value 21 in the PONO column. Similarly, if an XML document is stored as a LOB, then a text index may be used to optimize a search on the LOB column.

A mechanism is provided in the database to generate a database query, for example a SQL query, based on the user's XML query and the mapping information associated with the storage of the XML document in the relational database.

Referring to FIG. 2, assume that the table of FIG. 2 is called PO-TABLE and that a B-tree index is generated on the relational column PONO. Assume that an XML user submits the following query:
    SELECT*From PO-TABLE
    Where EXISTNODE (PO-XML, '/PO[PONO=21]')

According to certain embodiments of the invention, the above XML user's query is converted to the following:
    SELECT*From PO-TABLE
    Where PO-XML.PONO=21
Thus, an index search can be performed for the predicate of PONO.

Hardware

Figure 3:
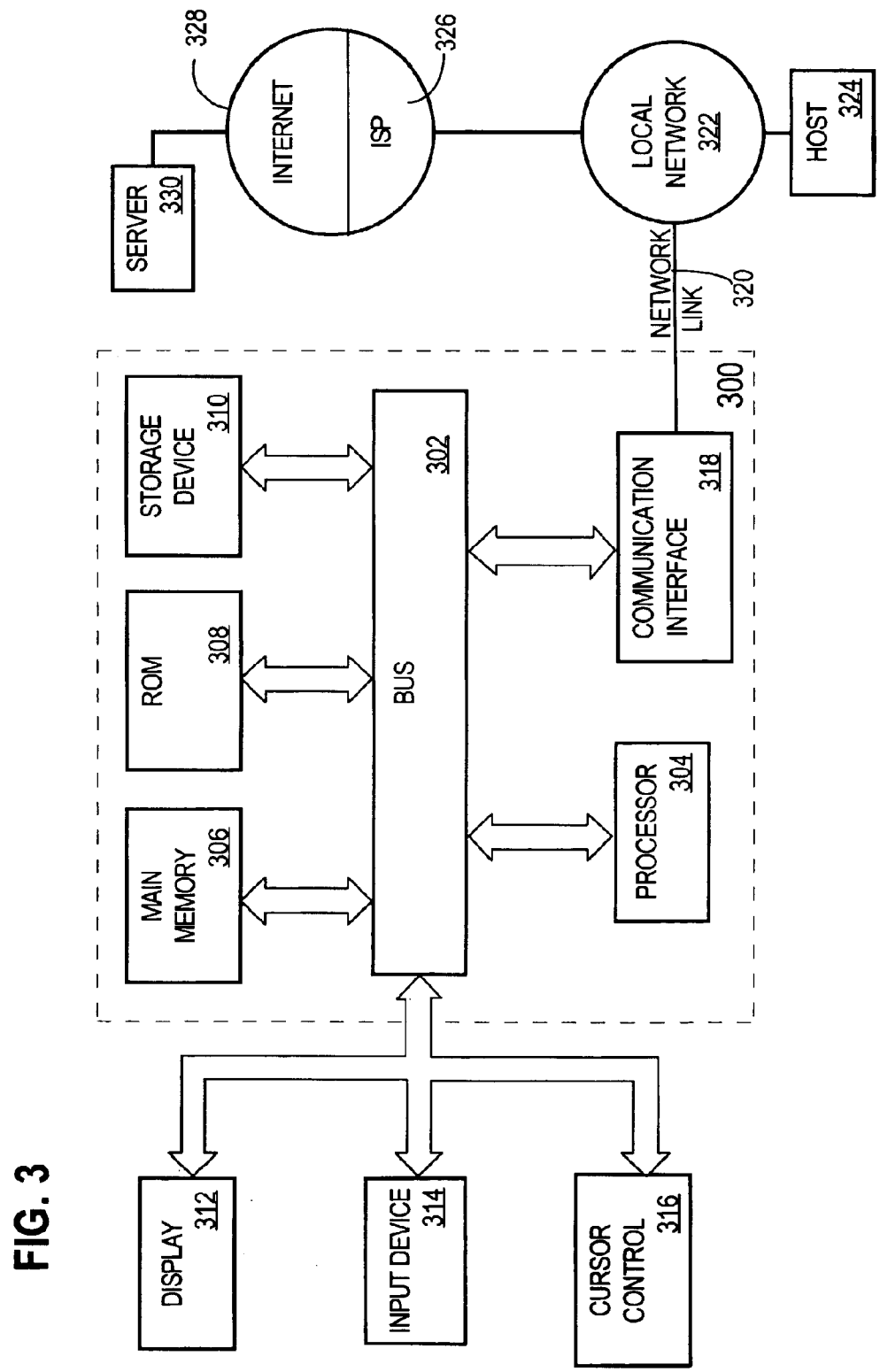
FIG. 3 depicts a computer upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are implemented by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application implements the techniques described herein.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing data in a relational database, the method comprising the steps of:
   receiving at a database server an XML document for storage in the relational database;
   the database server storing in the relational database mapping information that indicates a mapping of one or more fields in the XML document to corresponding columns in the relational database;
   the database server storing data from the XML document in the relational database in locations that are determined by the database server based on the mapping information; and
   in response to the database server receiving a request for data from the XML document, the database server inspecting the mapping information to determine how to access the data from the XML document.

2. The method of claim 1 further comprising the steps of:
   determining which corresponding columns in the relational database to use to store data from fields of the XML document; and
   generating the mapping information of the one or more fields in the XML document to corresponding columns in the relational database.

3. The method of claim 1, wherein the step of storing data includes the steps of:
   storing values for a plurality of fields of the XML document into a first column of a relational table; and
   storing values for at least one field of the XML document into a second column of the relational table, wherein the second column is different from said first column.

4. The method of claim 1, wherein a request for data is an XML query.

5. The method of claim 4, further comprising the steps of:
   generating a database query based on the XML query and the mapping information; and
   executing the database query to access data from the XML document.

6. The method of claim 5, wherein the database query directly accesses the underlying relational columns and uses indexes.

7. The method of claim 6, wherein the indexes are relational indexes.

8. The method of claim 6, wherein the indexes are text indexes.

9. The method of claim 1, wherein a structure of the XML document is defined by a user to contain one or more fields of structured data, and wherein structured data is data that is of a type that corresponds to an existing relational data object type in the relational database.

10. The method of claim 1, wherein a structure of the XML document is defined by a user to contain one or more fields of unstructured data, and wherein unstructured data is data that is mapped to a LOB data type in the relational database during processing of the XML document for storage in the relational database.

11. The method of claim 1, wherein the mapping information is defined by a user.

12. The method of claim 11, wherein the user has an option to map more than one field of the XML document to each column of the relational database for storage.

13. The method of claim 1, wherein an XMLType datatype is defined by a database server that manages the relational database for storing the XML document.

14. The method of claim 13, wherein a set of operations are defined for the XMLType datatype by the database server.

15. The method of claim 14, wherein the set of operations comprises, extracting fragments of the XML document; testing for existence of one or more elements in the XML document;
extracting one or more values from the XML document; and
transforming the XML document.

16. The method of claim 1, wherein:
the mapping information maps a field of said XML document to a plurality of columns of a relational table; and
the step of storing data from the XML document includes parsing said field of said XML document to identify a plurality of values and storing each of the plurality of values in a different one of said plurality of columns of the relational table.

17. The method of claim 1, wherein:
the request specifies criteria for a field of the XML document;
the method includes determining whether the criteria is satisfied by performing the steps of:
determining, based on said mapping information, that the field is one of a plurality of fields that is mapped to a particular column;
parsing data in said particular column to locate a value of said field for said XML document; and
determining whether said value satisfies the criteria.

18. A computer-readable medium carrying one or more sequences of instructions for managing data within a relational database, which instructions, when executed by one or more processors, cause the one or more processors to carry out the steps of:
receiving at a database server an XML document for storage in the relational database;
the database server storing in the relational database mapping information that indicates a mapping of one or more fields in the XML document to corresponding columns in the relational database;
the database server storing data from the XML document in the relational database in locations that are determined by the database server based on the mapping information; and
in response to the database server receiving a request for data from the XML document, the database server inspecting the mapping information to determine how to access the data from the XML document.

19. The computer-readable medium of claim 18 further comprising the steps of:
determining which corresponding columns in the relational database to use to store data from fields of the XML document; and
generating the mapping information of the one or more fields in the XML document to corresponding columns in the relational database.

20. The computer-readable medium of claim 18, wherein the step of storing data includes the steps of:
storing values for a plurality of fields of the XML document into a first column of a relational table; and
storing values for at least one field of the XML document into a second column of the relational table, wherein the second column is different from said first column.

21. The computer-readable medium of claim 18, wherein a request for data is an XML query.

22. The computer-readable medium of claim 21, further comprising the steps of:
generating a database query based on the XML query and the mapping information; and
executing the database query to access data from the XML document.

23. The computer-readable medium of claim 22, wherein the database query directly accesses the underlying relational columns and uses indexes.

24. The computer-readable medium of claim 23, wherein the indexes are relational indexes.

25. The computer-readable medium of claim 23, wherein the indexes are text indexes.

26. The computer-readable medium of claim 18, wherein a structure of the XML document is defined by a user to contain one or more fields of structured data, and wherein structured data is data that is of a type that corresponds to an existing relational data object type in the relational database.

27. The computer-readable medium of claim 18, wherein a structure of the XML document is defined by a user to contain one or more fields of unstructured data, and wherein unstructured data is data that is mapped to a LOB data type in the relational database during processing of the XML document for storage in the relational database.

28. The computer-readable medium of claim 18, wherein the mapping information is defined by a user.

29. The computer-readable medium of claim 28, wherein the user has an option to map more than one field of the XML document to each column of the relational database for storage.

30. The computer-readable medium of claim 18, wherein an XMLType datatype is defined by a database server that manages the relational database for storing the XML document.

31. The computer-readable medium of claim 30, wherein a set of operations are defined for the XMLType datatype by the database server.

32. The computer-readable medium of claim 31, wherein the set of operations comprises,
extracting fragments of the XML document;
testing for existence of one or more elements in the XML document;
extracting one or more values from the XML document; and
transforming the XML document.

33. The computer-readable medium of claim 18, wherein:
the mapping information maps a field of said XML document to a plurality of columns of a relational table; and
the step of storing data from the XML document includes parsing said field of said XML document to identify a plurality of values and storing each of the plurality of values in a different one of said plurality of columns of the relational table.

34. The computer-readable medium of claim 18, wherein:
the request specifies criteria for a field of the XML document;
the method includes determining whether the criteria is satisfied by performing the steps of:
determining, based on said mapping information, that the field is one of a plurality of fields that is mapped to a particular column;
parsing data in said particular column to locate a value of said field for said XML document; and
determining whether said value satisfies the criteria.

* * * * *